Nov. 11, 1924.
A. A. GAZDA
1,515,197
ELECTRICAL PROTECTIVE DEVICE
Filed Dec. 13, 1917
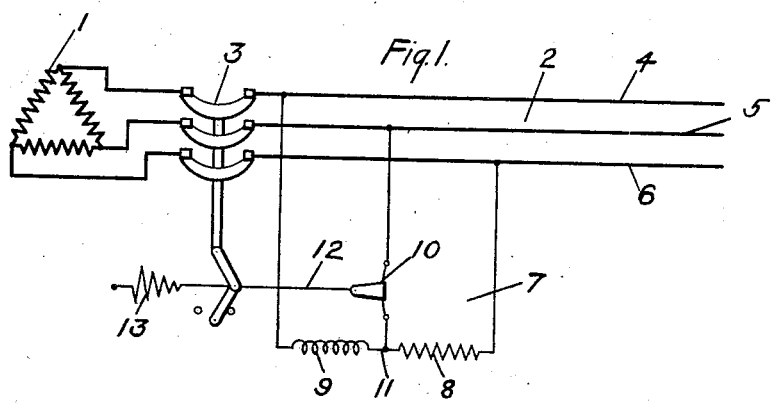
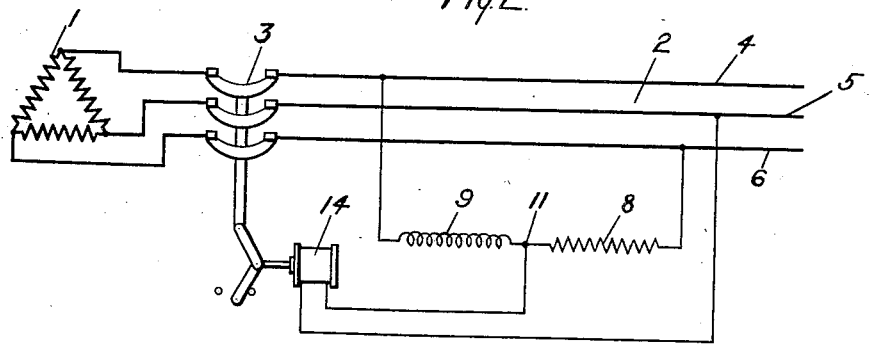
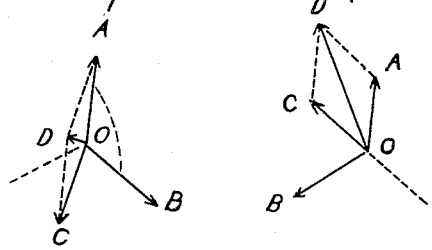
WITNESSES:
INVENTOR
Adolph A. Gazda
BY
ATTORNEY Patented Nov. 11, 1924.

1,515,197

UNITED STATES PATENT OFFICE.

ADOLPH A. GAZDA, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL PROTECTIVE DEVICE.

Application filed December 13, 1917. Serial No. 206,930.

*To all whom it may concern:*

Be it known that I, ADOLPH A. GAZDA, a citizen of the United States, and a resident of Wilkinsburg, in the county of Allegheny and State of Pennsylvania, have invented a new and useful Improvement in Electrical Protective Devices, of which the following is a specification.

My invention relates to electrical protective devices and particularly to reverse-phase tripping devices.

The object of my invention is to provide a reverse-phase protective device for an electrical circuit that shall be simple and inexpensive to construct and effective in its operation.

In carrying out my invention, I provide an auxiliary circuit comprising a reactor and a resistor traversed by currents that are substantially 180° out of phase. The auxiliary circuit is connected across two of the terminals of the polyphase device to be protected and an electro-responsive device, such as a fuse or a trip coil, is connected from the other terminal of the device to be protected to a point between the resistor and the reactor. When correct relations obtain in the main circuit, the currents traversing the two components of the auxiliary circuit are substantially 180° out of phase, and only a relatively small resultant current traverses the electro-responsive device, but, when the phase relation in the main circuit is changed by reason of the reversal of a connection, or by other means, sufficient current will traverse the electro-responsive device to actuate the same. The electro-responsive device may be adapted to control the tripping of a circuit interrupter or for actuating other similar devices.

Figure 1 of the accompanying drawings is a diagrammatic view of an electrical circuit embodying my invention; Fig. 2 is a diagrammatic view of an electrical circuit embodying a modified form of my invention, and Figs. 3 and 4 are diagrams illustrating the phase relation of the currents traversing the various portions of the protective device shown in Figs. 1 and 2.

In Fig. 1 of the drawings, a motor 1 is supplied with current through a polyphase circuit 2 that is provided with an interrupter 3. The circuit 2 comprises three conductors 4, 5 and 6 and a protective device 7 for tripping the interrupter 3 when the conductors 4, 5 and 6 are so connected that the proper phase relations do not obtain in the motor 1.

The protective device 7 comprises a resistor 8, a reactor 9 and a fusible conductor 10. The resistor 8 and the reactor 9 are connected across the conductors 4 and 6 and the fusible conductor 10 is connected between the conductor 5 and a point 11 intermediate the resistor 8 and the reactor 9. In other words, the three elements 8, 9 and 10 are star-connected to the circuit. The resistor 8 and the reactor 9 are so proportioned and connected that the voltage across the resistor leads, that across the reactor and the currents traversing the same are substantially 180° out of phase. Thus, under normal phase conditions in the circuit 2, the current traversing the fusible conductor 10 will be of relatively small value. A cord 12 is so connected between the toggle mechanism of the interrupter 3 and the fusible conductor 10 that, when the conductor 10 is fused, a spring 13 will be permitted to open the interrupter 3.

In Figs. 3 and 4 of the drawings, the line OA represents the current traversing the resistor 8 ,and the line OB represents the voltage across the reactor 9. However, since the circuit comprising the reactor 9 is highly inductive, the line OC represents the current traversing the same. It will be seen from Fig. 3 of the drawings that the lines OA and OC are substantially 180° out of phase and, consequently, the resultant current OD is of relatively small value. Of course, this value of current is not sufficient to fuse the conductor 10. However, if the phase relation in the circuit 2 is changed, the line OC, shown in Fig. 4, will shift the same amount, and the resultant current OD will be increased to a relatively high value sufficient to fuse the conductor 10. Thus, when the phase relation of the circuit 2 is changed, sufficient current will traverse the conductor 10 to fuse the same, and thereby permit the spring 13 to open the interrupter 3.

In Fig. 2 of the drawings, a trip coil 14 is connected from the conductor 5 to the mid-point 11 between the resistor 8 and the reactor 9 and is so proportioned that, under normal conditions, insufficient current will traverse the same to trip the interrupter 3, but when the phase relation in the circuit changes, sufficient current will traverse the same to trip the interrupter 3.

It will be understood that my invention is not limited to the particular structures illustrated, as various modifications may be made therein without departing from the spirit and scope of the invention, as set forth in the appended claims.

I claim as my invention:

1. A protective device for a polyphase circuit comprising a reactor and a resistor connected across one phase of the circuit and an electro-responsive device connected between another phase of the circuit and the mid-point between the resistor and the reactor.

2. A protective apparatus for a polyphase circuit comprising an auxiliary circuit connected across one phase of the circuit, and containing a resistor and a reactor and an electro-responsive device connected between an intermediate point of the auxiliary circuit and another phase of the circuit, said auxiliary circuit having such characteristics that normally a relatively small current traverses the responsive device and a relatively large current traverses the same only when one phase of the main circuit is reversed.

3. A protective device for a polyphase motor comprising a resistor and a reactor connected across one phase of the motor and an electro-responsive device connected from another phase of the motor to a point between the resistor and the reactor.

4. A protective device for a polyphase motor comprising two resistors normally having currents substantially 180° out of phase with respect to each other connected across one phase of the motor and an electro-responsive device connected from another phase of the motor to a point between the said resistors.

5. A protective device for a three-phase motor comprising two circuits traversed by current substantially 180° out of phase, said circuits connected across two terminals of the motor, and an electro-responsive device connected from the other terminal of the motor to a point between the said out-of-phase circuits.

6. In a polyphase electric circuit, the combination with a circuit interrupter and a trip coil therefor, of a reactor and a resistor connected across one phase of the circuit and traversed by currents substantially 180° out of phase with each other, and means for connecting the trip coil between the other phase of the circuit and a point between the reactor and the resistor.

7. In a polyphase electric circuit, the combination with a circuit-controlling device, of a reactor and a resistor connected across one phase of the circuit and traversed by substantially out-of-phase currents, and means for so connecting the circuit-controlling device to the mid-point between the resistor and the reactor that the resultant current traverses the same.

8. A protective device for a polyphase circuit comprising a reactor, a resistor and an electro-responsive device connected in star relation to the circuit with one element in each branch and so proportioned that a predetermined current traverses the electro-responsive device only when a phase of the circuit is reversed.

9. A protective device for a three-phase circuit comprising two resistors and an electro-responsive device connected in star relation to the circuit with one element in each branch, said resistors having such characteristics as to cause the currents normally traversing the same to be substantially 180° out of phase and the current traversing the electro-responsive device to have normally a relatively small value.

10. A protective device for a three-phase circuit comprising two resistors and an electro-responsive device connected in star relation to the circuit with one element in each branch, said resistors having such characteristics as to cause the currents normally traversing the same to be out of phase and the electro-responsive device to be traversed by a predetermined value of current only when one phase of the circuit is reversed.

In testimony whereof, I have hereunto subscribed my name this 28th day of Nov. 1917.

ADOLPH A. GAZDA.